United States Patent
Nayak (10) Patent No.: US 9,274,651 B2
(45) Date of Patent: Mar. 1, 2016

(54) APPARATUS TO TRACK A POINTING DEVICE

(71) Applicant: Hewlett-Packard Development Company, L.P., Houston, TX (US)

(72) Inventor: Vijaykumar Nayak, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 237 days.

(21) Appl. No.: 13/669,108

(22) Filed: Nov. 5, 2012

(65) Prior Publication Data

US 2014/0125592 A1    May 8, 2014

(51) Int. Cl.
    *G06F 3/043*    (2006.01)
    *G06F 3/042*    (2006.01)

(52) U.S. Cl.
    CPC ............ *G06F 3/0436* (2013.01); *G06F 3/0421* (2013.01); *G06F 3/0425* (2013.01)

(58) Field of Classification Search
    CPC ...... G06F 3/033; G06F 3/038; G06F 3/04815
    USPC .......................... 345/653, 644, 679, 156–158
    See application file for complete search history.

(56) References Cited

U.S. PATENT DOCUMENTS

| | | | |
|---|---|---|---|
| 5,148,337 A * | 9/1992 | Cullen et al. ............... | 360/97.11 |
| 7,023,536 B2 | 4/2006 | Zhang et al. | |
| 7,038,846 B2 | 5/2006 | Mandella et al. | |
| 7,088,440 B2 | 8/2006 | Buermann et al. | |
| 7,110,100 B2 | 9/2006 | Buermann et al. | |
| 7,113,270 B2 | 9/2006 | Buermann et al. | |
| 7,161,664 B2 | 1/2007 | Buermann et al. | |
| 7,203,384 B2 | 4/2007 | Carl et al. | |
| 7,268,956 B2 | 9/2007 | Mandella et al. | |
| 7,474,809 B2 | 1/2009 | Carl et al. | |
| 7,729,515 B2 | 6/2010 | Mandella et al. | |

(Continued)

FOREIGN PATENT DOCUMENTS

| | | |
|---|---|---|
| EP | 1424538 | 6/2004 |
| TW | 201033886 A1 | 9/2010 |
| TW | 201232312 A1 | 8/2012 |

OTHER PUBLICATIONS

Johnny Chung Lee. Projector Based Location Discovery and Tracking, Home Computer Interaction Institute. School of Computer Science. Carnegie Mellon University. Pittsburgh, PA 15213, 2008.

(Continued)

*Primary Examiner* — Seokyun Moon
(74) *Attorney, Agent, or Firm* — Hewlett-Packard Patent Department (57) ABSTRACT

An apparatus for use in helping to track a pointing device is disclosed herein. An example of the apparatus includes an orientation member coupled to the pointing device that includes a plurality of points at least some of which define a plane. The apparatus also includes a sensor to detect the plurality of points of the orientation member and a processor to determine a location in a workspace of each of the points of the orientation member detected by the sensor. The processor also determines a geometric property of the plane defined by at least some of the points of the orientation member and locates a position of an end of the pointing device along a line segment associated with the geometric property. A method for use in helping to track a pointing device in a workspace and a non-volatile storage medium are also disclosed herein.

20 Claims, 9 Drawing Sheets

(56) References Cited

U.S. PATENT DOCUMENTS

| | | | |
|---|---|---|---|
| 7,826,641 | B2 | 11/2010 | Mandella et al. |
| 7,961,909 | B2 | 6/2011 | Mandella et al. |
| 8,792,709 | B2* | 7/2014 | Pulla et al. ............... 382/154 |
| 2002/0118181 | A1* | 8/2002 | Sekendur ............... 345/179 |
| 2005/0057533 | A1 | 3/2005 | Liu |
| 2005/0168437 | A1 | 8/2005 | Carl et al. |
| 2006/0082546 | A1* | 4/2006 | Wey ............... 345/156 |
| 2006/0269727 | A1* | 11/2006 | Sugita et al. ............... 428/195.1 |
| 2007/0126716 | A1* | 6/2007 | Haverly ............... 345/179 |
| 2007/0211022 | A1* | 9/2007 | Boillot ............... 345/156 |
| 2007/0279436 | A1 | 12/2007 | Ng et al. |
| 2010/0091112 | A1 | 4/2010 | Veeser et al. |
| 2011/0227915 | A1 | 9/2011 | Mandella et al. |
| 2012/0038549 | A1 | 2/2012 | Mandella et al. |
| 2012/0194457 | A1* | 8/2012 | Cannon et al. ............... 345/173 |
| 2013/0106782 | A1* | 5/2013 | Nowatzyk et al. ............ 345/175 |
| 2013/0194418 | A1 | 8/2013 | Gonzalez-Banos et al. |
| 2014/0098070 | A1* | 4/2014 | Pemberton-Pigott ......... 345/179 |

OTHER PUBLICATIONS

Gao, Rui et al; Microsoft Research-Mobile Surface; Microsoft Research; 2010; http://research.microsoft.com/en-us/projects/mobilesurface/.

Hand, Randall; Infinite Z Launches zSpace Virtual Holographic 3D Display for Designers; VizWorld.com; Dec. 13, 2011; http://www.vizworld.com/2011/12/infinite-launches-zspace-virtual-holographic-3d-display-designers/#sthash.j6Ys61PX.dpbs.

Harrison, Beverly & Ziola, Ryder; Bringing Toys to Life: Intel Labs OASIS Project; Augmented Engineering; Jan. 26, 2011; http://augmentedengineering.wordpress.com/2011/01/26/bringing-toys-to-life-intel-labs-oasis-project/.

Harrison, Chris et al; OmniTouch: Wearable Multitouch interaction Everywhere; UIST'11; Oct. 16, 2011; Santa Barbara, California; http://research.microsoft.com/en-us/um/people/awilson/publications/HarrisonUIST2011/HarrisonUIST2011.html.

Hartmann, Bjorn et al; Pictionaire: Supporting Collaborative Design Work by Integrating Physical and Digital Artifacts; CSCW 2010; Feb. 6, 2010; Savannah, Georgia; http://research.microsoft.com/en-us/um/people/awilson/publications/HartmannCSCW2010/HartmannCSCW2010.html.

Hinckley, Ken et al; Pen + Touch = New Tools; UIST'10; Oct. 3, 2010; New York, New York; http://research.microsoft.com/en-us/um/people/awilson/publications/HinckleyUIST2010/HinckleyUIST2010.html.

Izadi, Shahram et al; C-Slate: A Multi-Touch and Object Recognition System for Remote Collaboration Using Horizontal Surfaces; IEEE; 2007; http://research.microsoft.com/pubs/132551/cslate1.pdf.

Johnny Chung Lee. Projector Based Location Discovery and Tracking, Home Computer Interaction Institute School of Computer Science. Carnegie Mellon University. Pittsburgh; PA 15213. 2008.

Juniuzovic, Sasa et al: Microsoft Research-IlluminShare; Microsoft Research: 2012: http://delivery.acm.org/10.1145/2210000/2208333/p1919-junuzovic.pdf?ip=15 219.153.76&id=2208333 &acc=ACTIVE%20SERVICE&key= C2716FEBFA981EF153FE223D54A46A411F9E1F05F1DA6F38 &CFID=271558808&CFTOKEN=CFTOKEN=96334392&__acm__=1387226323_00af7aa5e159c7c67d724c49ef01bacf.

Kane; Shaun K. et al; Bonfire: A Nomadic System for Hybrid Laptop-Tabletop interaction; UIST'09; Oct. 4, 2009; Victoria, British Columbia, Canada; http://dub.washington.edu/djangosite/media/papers/uist09.pdf.

Linder, Natan et al; LuminAR: Portable Robotic Augmented Reality Interface Design and Prototype; UIST'10, Oct. 3, 2010; New York; New York; http://fluid.media.mit.edu/sites/default/files/2010-10-03-luminar_uist10_demo.pdf.

Melanson, Donald; Microsoft Research Working on Portable Surface; Mar. 2, 2010; http://engadget.com/2010/03/02/microsoft-research-working-on-portable-surface/.

Melanson, Donald; Wiimote Repurposed for Multi-Point Interactive Whiteboard; Dec. 10, 2007; http://www.engadget.com/2007/12/10/wiimote-repurposed-for-multi-point-interactive-whiteboard/.

Simonite, Tom; A Kitchen Countertop With a Brain; MIT Technology Review; Jul. 2, 2010; http://www.technologyreview.com/news/419639/a-kitchen-countertop-with-a-brain/.

Wilson, Andrew D. et al; Combining Multiple Depth Cameras and Projectors for Interactions on, Above, and Between Surfaces; UIST'10; Oct. 3, 2010; New York, New York; http://research.microsoft.com/en-us/um/people/awilson/publications/WilsonUIST2010/WilsonUIST2010.html.

Wilson, Andrew D.; Using a Depth Camera as a Touch Sensor; ITS 2010: Devices & Algorithms; Nov. 7, 2010; Saarbrucken, Germany; http://research.microsoft.com/en-us/um/people/awilson/publications/WilsonITS2010/WilsonITS2010.html.

* cited by examiner

FIG. 14

APPARATUS TO TRACK A POINTING DEVICE

BACKGROUND

Users of imaging and projection systems value ease of operation and flexibility in such systems. When possible, they also appreciate the ability to realize cost savings associated with such systems. Businesses may, therefore, endeavor to provide such features and benefits to these users.

BRIEF DESCRIPTION OF THE DRAWINGS

The following detailed description references the drawings, wherein.

DETAILED DESCRIPTION

Pointing devices may be utilized in multi-dimensional projection systems to input data and information, to manipulate or highlight objects and images, and to operate or control such systems. Tracking the position of such pointing devices can be accomplished actively or passively.

Active tracking can include the use of one or more devices (e.g., pressure transducers) in the pointing device itself that provide feedback as to the position of the pointing device within a workspace. Such a tracking approach, however, does have some drawbacks in that these devices add to the cost and complexity of multi-dimensional projection systems. They also limit the flexibility of such systems in that a dedicated pointing device that includes such tracking devices needs to be used.

Passive tracking can include the use of so-called "dumb" pointing devices that do not have one or more tracking devices to provide feedback as to the position of the pointing device within the workspace. Instead, such passive tracking can utilize pattern recognition to locate the position of the pointing device and track it within the workspace. Such pattern recognition, however, can be computationally demanding, thereby adding to the cost and complexity of a multi-dimensional projection system.

Figure 1:
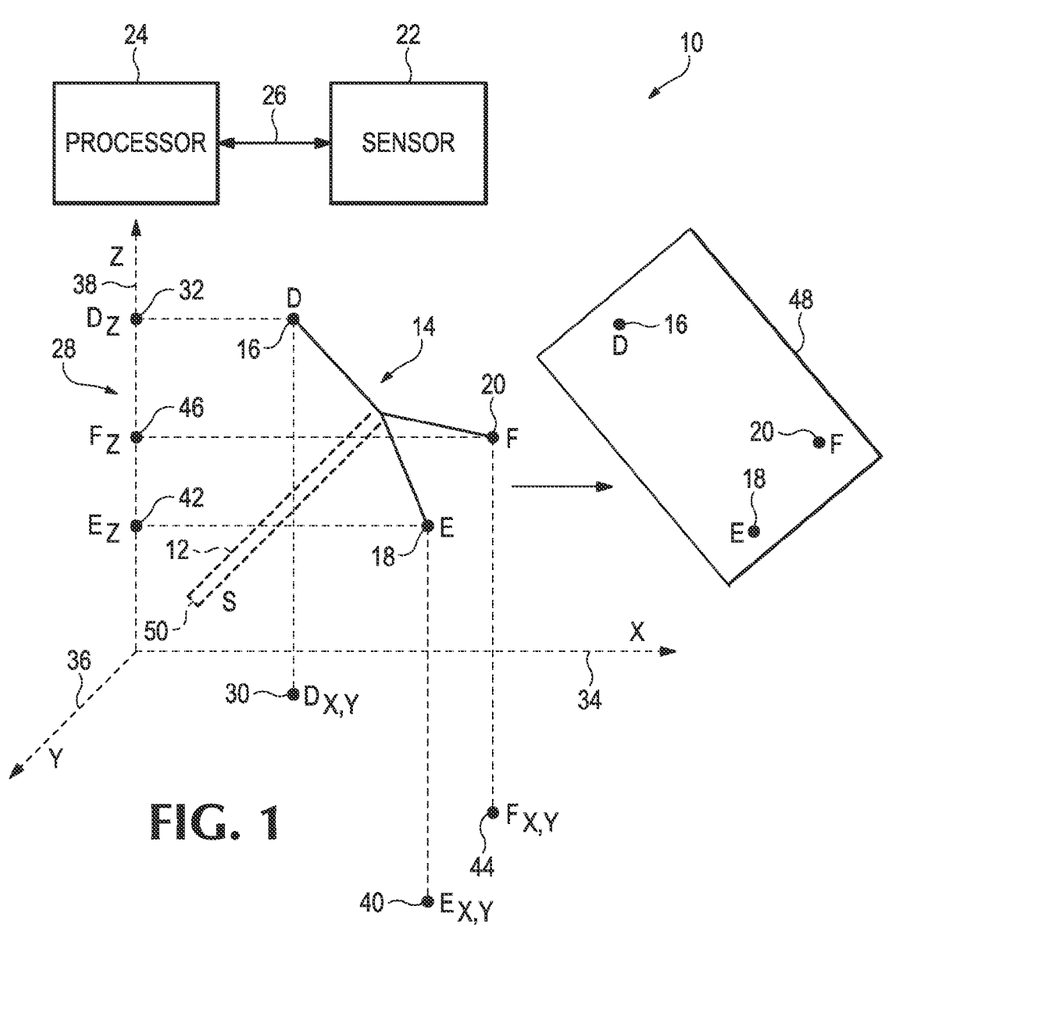
FIG. 1 is an example of an illustration of an apparatus for use in helping to track a pointing device.

An example of an apparatus 10 for use in helping to track a pointing device 12 that is directed to avoiding these above-described issues associated with active and passive tracking in multi-dimensional projection systems is illustrated in FIG. 1. As used herein, the term "processor" is defined as including, but not necessarily being limited to, an instruction execution system such as a computer/processor based system, an Application Specific Integrated Circuit (ASIC), or a hardware and/or software system that can fetch or obtain the logic from a non-volatile storage medium and execute the instructions contained therein. "Processor" can also include any state-machine, microprocessor, cloud-based utility, service or feature, or any other analogue, digital and/or mechanical implementation thereof.

As used herein, the term "non-volatile storage medium" is defined as including, but not necessarily being limited to, any media that can contain, store, or maintain programs, information, and data. A non-volatile storage medium may include any one of many physical media such as, for example, electronic, magnetic, optical, electromagnetic, or semiconductor media. More specific examples of suitable non-volatile storage medium include, but are not limited to, a magnetic computer diskette such as floppy diskettes or hard drives, magnetic tape, a backed-up random access memory (RAM), a read-only memory (ROM), an erasable programmable read-only memory (EPROM), a flash drive, a compact disc (CD), or a digital video disk (DVD).

As used herein, "pointing device" is defined as including, but not necessarily being limited to, a stylus, writing instrument (e.g., pen or pencil), mouse, pointer, marker, or similar instrument. As used herein, "track" and "tracking" are defined as including, but not necessarily being limited to, following, detecting, tracing, and/or anticipating the position of a pointing device within a workspace.

As used herein, "workspace" is defined as including, but not necessarily being limited to, a multi-dimensional (e.g., two or three dimensions) area, surface, space, or location in which a task, project or work may be performed or completed. As used herein, "sensor" is defined as including, but not necessarily being limited to, one or more cameras, depth sensors, stereoscopic systems, lens-based image capture devices, electrical sensor, magnetic sensor, photoelectric sensor, and/or light-based sensor.

As used herein, "orientation member" is defined as including, but not necessarily being limited to, a multi-dimensional (e.g., two or three dimensions) structure or solid that includes a plurality of points at least some of which define a plane. As used herein, "point" and "points" are defined as including, but not necessarily being limited to, colored regions or elements, reflective regions or elements, textured elements or regions, magnetic elements, regions or magnets, lighted regions, elements, and/or lights, etc.

Referring again to FIG. 1, apparatus 10 includes an orientation member 14 coupled to pointing device 12 and including a plurality of points 16, 18, and 20, respectively at locations D, E, and F. As can also be seen in FIG. 1, apparatus 10 additionally includes a sensor 22 to detect points 16, 18, and 20 of orientation member 14 and a processor 24 coupled to sensor 22, as generally indicated by double-headed arrow 26, to receive information therefrom and also to control operation of sensor 22. Processor 24 determines a location in workspace 28 of each of points 16, 18, and 20 of orientation member 14 detected by sensor 22.

In the example shown in FIG. 1, point D is located by x and y coordinates $D_{x,y}$ 30 and z coordinate $D_z$ 32 of the Cartesian coordinate system defined by x-axis 34, y-axis 36, and z-axis 38. Similarly, point E is located by x and y coordinates $E_{x,y}$ 40 and z coordinate $E_z$ 42. Point F is located by x and y coordinates $F_{x,y}$ 44 and z coordinate $F_z$ 46. Although, in the example illustrated in FIG. 1, the locations of points 16, 18, and 20 are determined by processor 24 utilizing a Cartesian coordinate system, it is to be understood that in other example of apparatus 10, processor 24 may use a different coordinate system (e.g., spherical, cylindrical, etc.) to locate points D, E, and F of orientation member 14, rather than a Cartesian coordinate system.

Processor 24 also correlates with a geometric property of orientation member 14 defined by at least some of the points D, E, and F. In at least some cases, this geometric property is already predetermined or known and this correlation confirms accurate functioning or performance of apparatus 10. In this example, all points 16, 18, and 20 define and lie within plane 48. As discussed more fully below, processor 24 also locates a position of an end 50 of pointing device 12 in workspace 28 through the use of a line segment associated with the geometric property.

Figure 2:
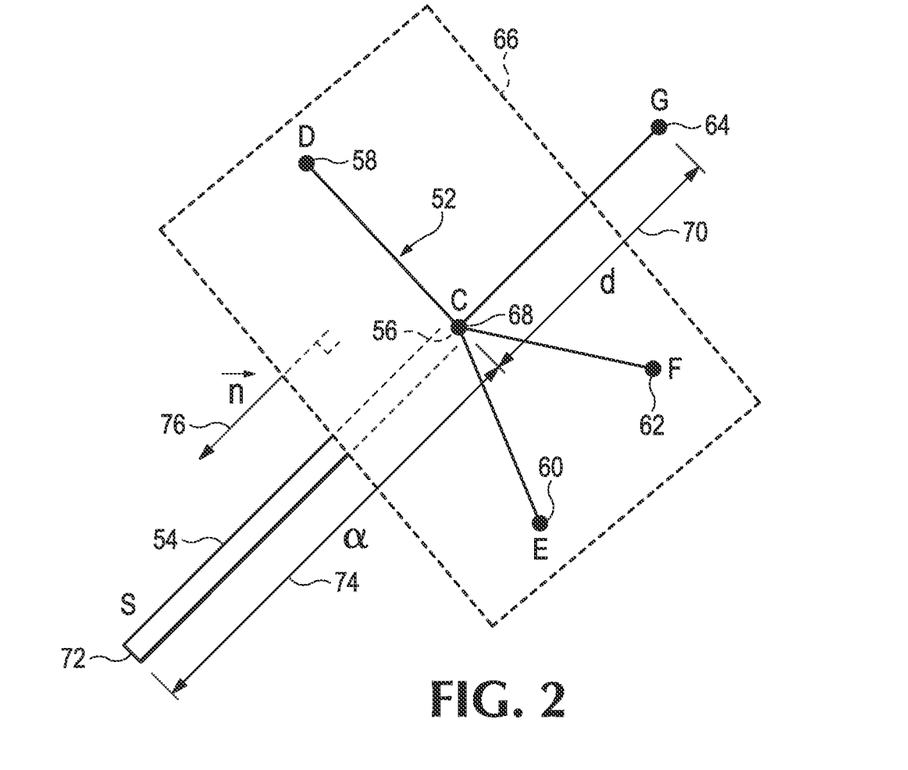
FIG. 2 is an example of an illustration of an orientation member coupled to a pointing device.

An example of an illustration of an orientation member 52 coupled to a pointing device 54 is shown in FIG. 2. Orientation member 52 and pointing device 54 may be part of another example of an apparatus, such as apparatus 10. As can be seen in FIG. 2, orientation member 52 is coupled to an end 56 of pointing device 54 and includes a plurality of points 58, 60, 62, and 64, respectively at locations D, E, F, and G, which may be detected by a sensor, such as sensor 22 of FIG. 1. Points 58, 60, and 62 of orientation member 52 define a plane 66, as shown. As can also be seen in FIG. 2, point 68 at location C lies at a geometric property of orientation member 52 which may be determined by a processor, such as processor 24 of FIG. 1. In this case, point 68 lies at a centroid of an equilateral triangle defined by points 58, 60, and 62 and lying in plane 66.

As can additionally be seen in FIG. 2, point 64 at location G of orientation member 52 lies outside of plane 66 a distance "d" 70. As can further be seen in FIG. 2, point 64, along with point 68, also defines a line segment CG. The length of line segment CG is equal to distance "d" 70. The other end 72 of pointing device 54 at location S also lies outside of plane 66 a distance "α" 74. End 72 of pointing device 54 at location S, along with point 68, also defines a line segment CS. The length of line segment CS is equal to distance "α" 74. Either or both the distances "d" and "α" may be predefined. Alternatively, either or both the distances "d" and "α" may be determined by a user through an auto calibration routine.

End 72 of pointing device 54 at location S may be located, for example, through the use of a processor, such as processor 24 of FIG. 1, by creating a line segment that is both substantially perpendicular to plane 66 defined by points 58, 60, and 62 of orientation member 52, as generally indicated by the normal vector 76 ($n$), and that lies adjacent centroid 68 (C). A further verification of the location of end 72 of pointing device 54 may be performed by verifying that line segment CS is substantially parallel to line segment CG. Once end 72 of pointing device 54 is located, the operation to be performed within a multi-dimensional projection system (e.g., drawing, highlighting, selecting, generation of a virtual ink on a surface, etc.) can be performed.

Figure 3:
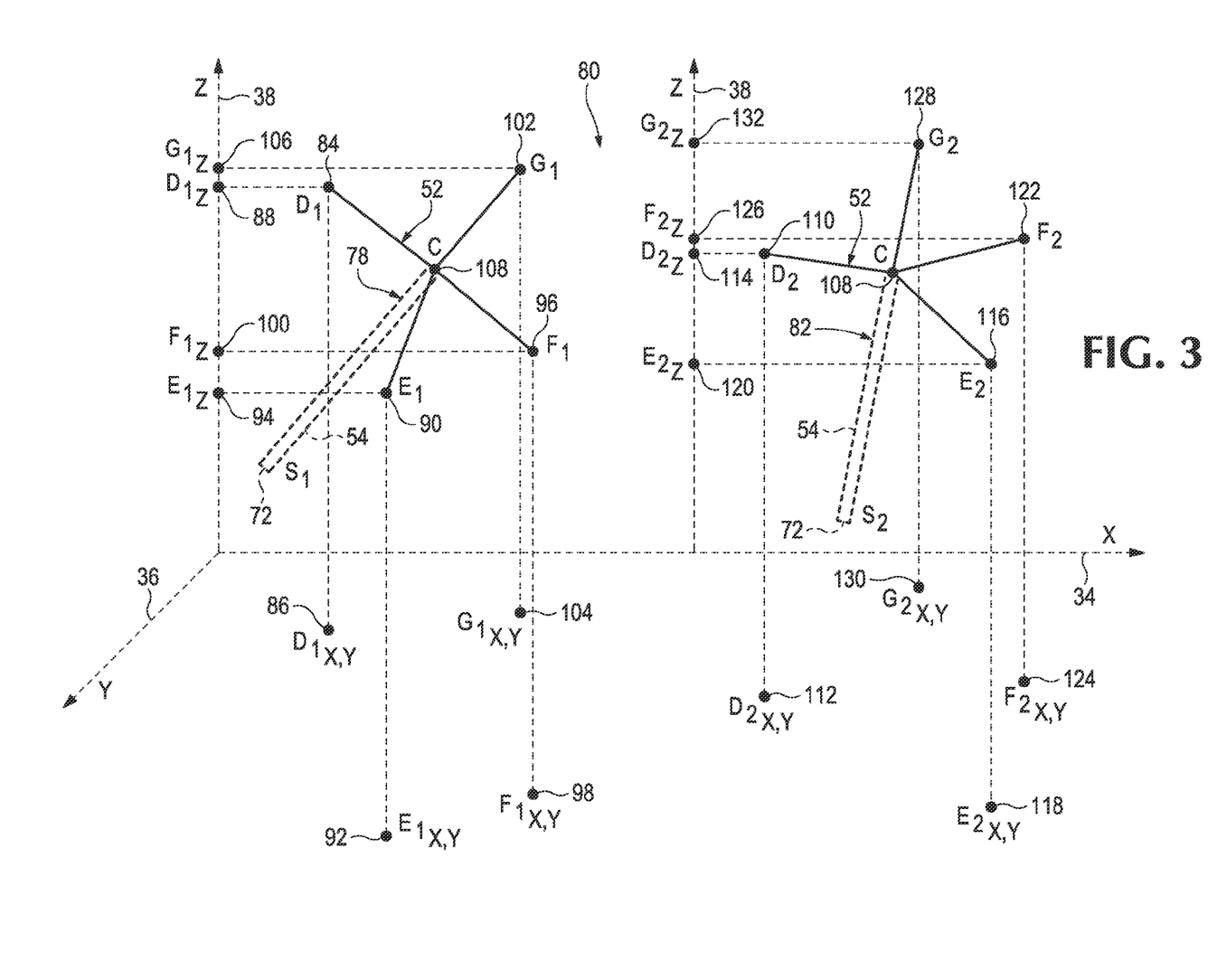
FIG. 3 is an example of an illustration of movement of an orientation member and a pointing device from a first place in a workspace to a second place in the workspace.

An example of an illustration of movement of orientation member 52 and pointing device 54 from a first place 78 in a workspace 80 to a second place 82 in workspace 80 is shown in FIG. 3. As can be seen in FIG. 3, first place 78, point $D_1$ 84 of orientation member 52 is located by x and y coordinates $D_{1x,y}$ 86 and z coordinate $D_{1z}$ 88 of the Cartesian coordinate system defined by x-axis 34, y-axis 36, and z-axis 38. Similarly, point $E_1$ 90 is located by x and y coordinates $E_{1x,y}$ 92 and z coordinate $E_{1z}$ 94. Point $F_1$ 96 is located by x and y coordinates $F_{1x,y}$ 98 and z coordinate $F_{1z}$ 100. Finally, point $G_1$ 102 is located by x and y coordinates $G_{1x,y}$ 104 and z coordinate $G_{1z}$ 106. Point C 108 is also shown at first place 78 in workspace 80. As discussed above, it represents the geometric property of being the centroid of orientation member 52.

As can be seen in FIG. 3, in second place 82, point $D_2$ 110 of orientation member 52 is located by x and y coordinates $D_{2x,y}$ 112 and z coordinate $D_{2z}$ 114 of the Cartesian coordinate system defined by x-axis 34, y-axis 36, and z-axis 38. Similarly, point $E_2$ 116 is located by x and y coordinates $E_{2x,y}$ 118 and z coordinate $E_{2z}$ 120. Point $F_2$ 122 is located by x and y coordinates $F_{2x,y}$ and z coordinate $F_{2z}$ 126. Finally, point $G_2$ 128 is located by x and y coordinates $G_{2x,y}$ 130 and z coordinate $G_{2z}$ 132. Point C 108 is now shown at second place 82 in workspace 80.

Figure 4:
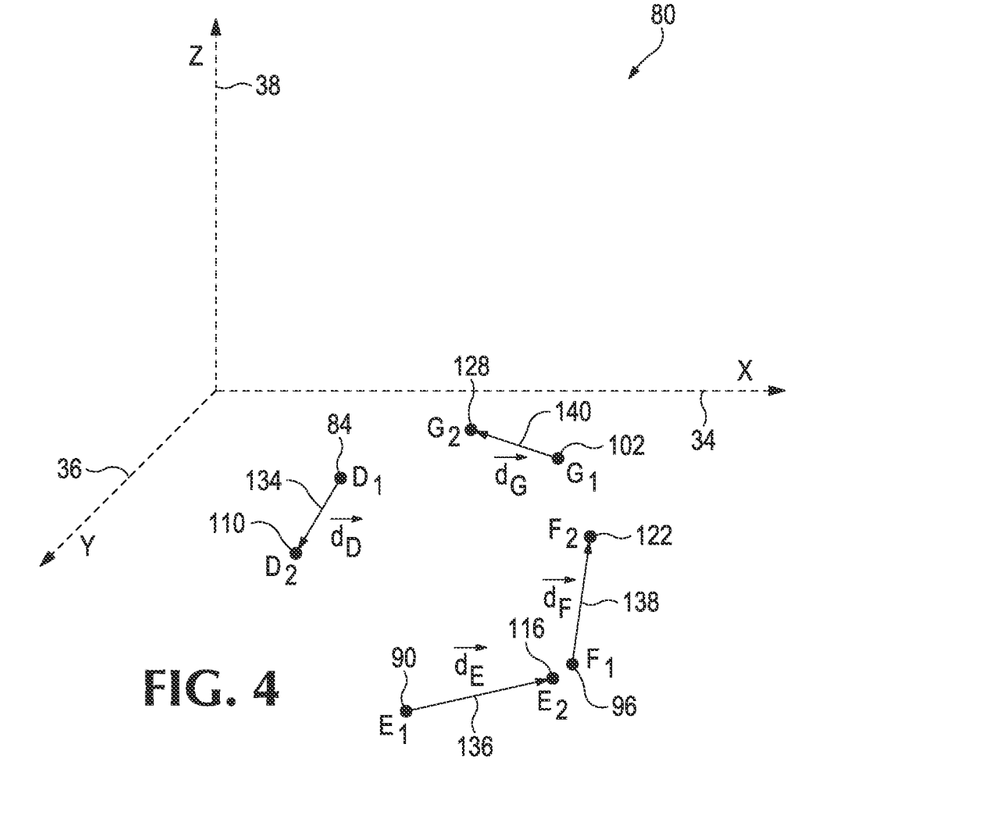
FIG. 4 is an example of an illustration of a determination of a displacement of the pointing device of FIG. 3.

An example of an illustration of a determination of a displacement of pointing device 54 of FIG. 3 is shown in FIG. 4. As can be seen in FIG. 4, the change in location of each of the points $D_1$ 84, $E_1$ 90, $F_1$ 96, and $G_1$ 102 to $D_2$ 110, $E_2$ 116, $F_2$ 122, and $G_2$ 128 as a result of movement of orientation member 52 and pointing device 54 from first place 78 in workspace 80 to second place 82, as discussed above in connection with FIG. 3, is shown. These location changes are represented by displacement vectors $d_D$ 134, $d_E$ 136, $d_F$ 138, and $d_G$ 140 in FIG. 4. A processor, such as processor 24, may utilize displacement vectors $d_D$ 134, $d_E$ 136, $d_F$ 138, and $d_G$ 140 to determine the velocity and/or acceleration of pointing device 54 which can then be used to help determine the position (current or future/predictive) of end 72 of pointing device 54 in workspace 80.

Figures 5, 6, 7, 8:
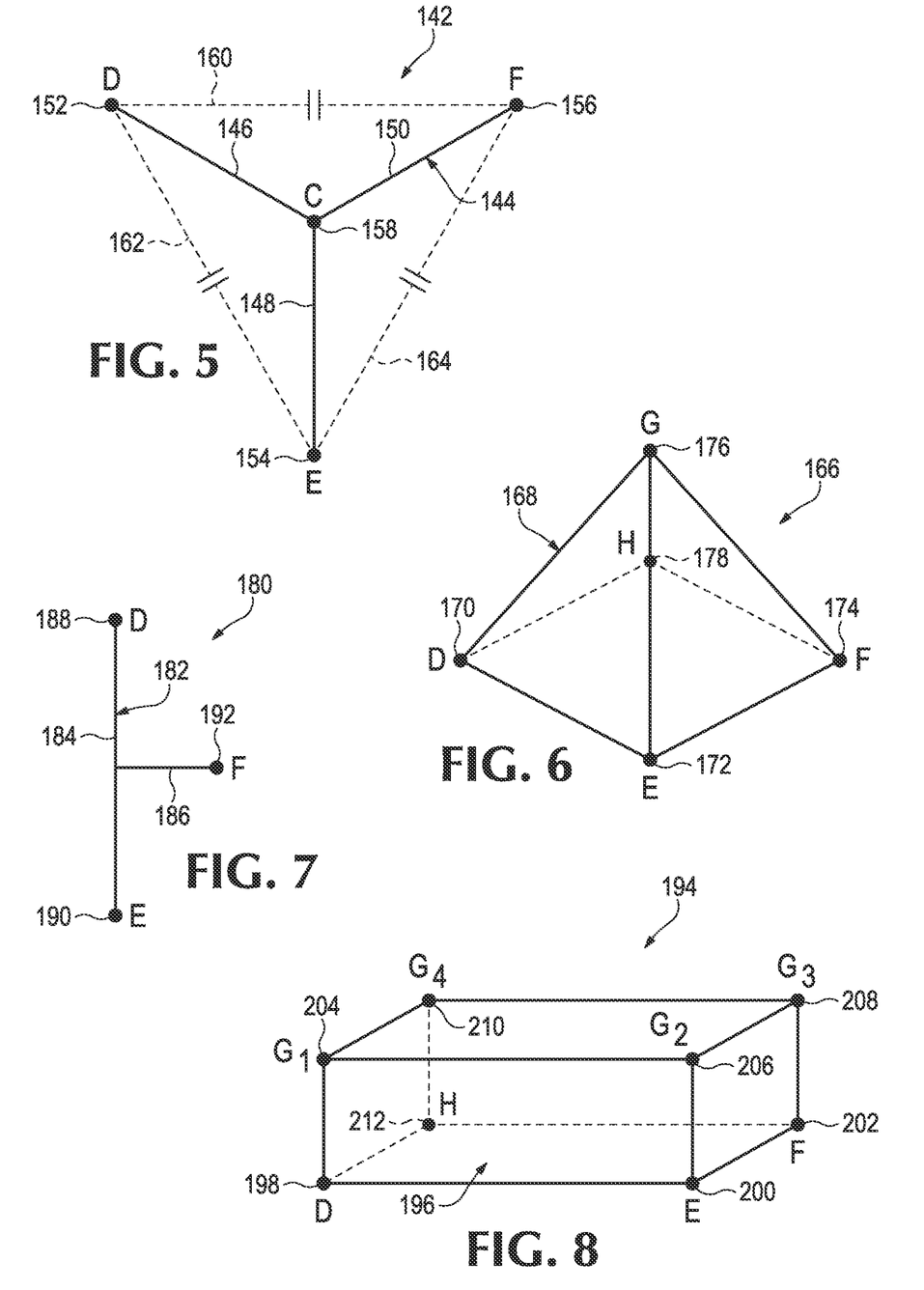
FIG. 5 is an example of an orientation member.
FIG. 6 is an example of another orientation member.
FIG. 7 is an additional example of an orientation member.
FIG. 8 is a further example of an orientation member.

An example of an orientation member 142 is shown in FIG. 5. As can be seen in FIG. 5, orientation member 142 includes a skeletal structure 144 that has wire members 146, 148, and 150 that respectively terminate in points D 152, E 154, and F 156 (e.g., red spheres, green balls, etc.) and join together at location C 158. In this example, wire members 146, 148, and 150 define an equilateral triangle point 158 lies at the centroid of that triangle.

An example of another orientation member 166 is shown in FIG. 6. As can be seen in FIG. 6, orientation member 166 includes a solid pyramidal structure 168 that includes points D 170, E 172, F 174, G 176, and H 178.

An additional example of an orientation member 180 is shown in FIG. 7. As can be seen in FIG. 7, orientation member 180 includes a skeletal structure 182 that has wire members 184 and 186 that respectively terminate in points D 188, E 190, and F 192. As can also be seen in FIG. 7, wire members 184 and 186 are substantially perpendicular to one another.

A further example of an orientation member 194 is shown in FIG. 8. As can be seen in FIG. 8, orientation member 194 includes a solid rectangle or box 196 that includes points D 198, E 200, F 202, $G_1$ 204, $G_2$ 206, $G_3$ 208, $G_4$ 210, and H 212.

Figure 9:
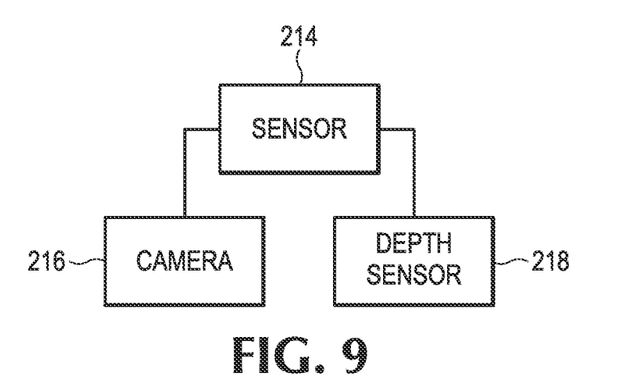
FIG. 9 is an illustration of an example of a sensor.

An illustration of an example of a sensor 214 is shown in FIG. 9. As can be seen in FIG. 9, in this example, sensor 214 includes a camera 216 and a depth sensor 218. Use of a depth sensor 218 helps in the creation of a depth map of the various surfaces within a workspace which is useful in helping to track a pointing device and also when performing the operations within a multi-dimensional projection system, such as generation of a virtual ink on a surface, as discussed above.

Figure 10:
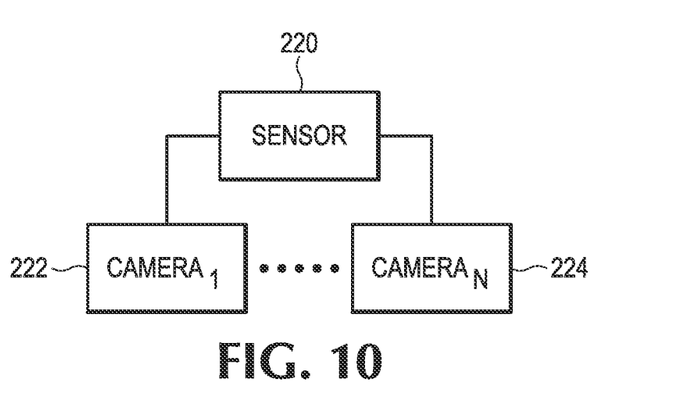
FIG. 10 is an illustration of another example of a sensor.

An illustration of another example of a sensor 220 is shown in FIG. 10. As can be seen in FIG. 10, in this example, sensor 220 includes a plurality of cameras (i.e., two or more cameras) shown as $camera_1$ 222 through $camera_N$ 224. In this implementation, stereoscopic and/or additional views of an orientation member and its points may be realized and provided to a processor for use in helping to track a pointing device and perform operations within a multi-dimensional projection system.

Figure 11:
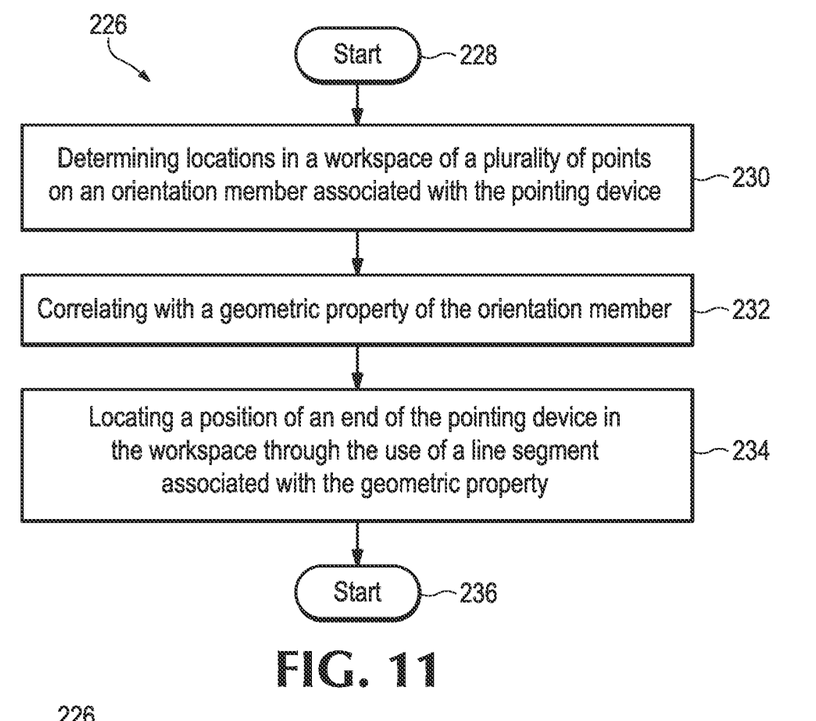
FIG. 11 is an illustration of an example of a method for use in helping to track a pointing device in a workspace.

An illustration of an example of a method for use in helping to track a pointing device in a workspace 226 is shown in FIG. 11. As can be seen in FIG. 11, method 226 starts or begins 228 by determining locations in a workspace of a plurality of points on an orientation member associated with the pointing device, as indicated by block 230. Method 226 continues by correlating with a geometric property of the orientation member, as indicated by block 232, and locating a position of an end of the pointing device in the workspace through the use of a line segment associated with the geometric property, as indicated by block 234. Method 226 may then end 236.

Figure 12:
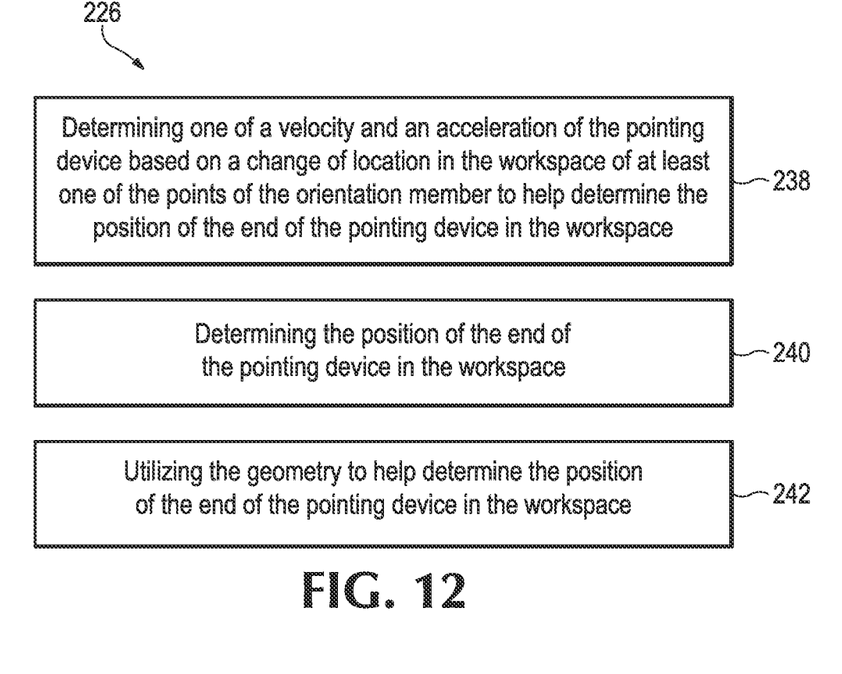
FIG. 12 is an illustration of an example of additional elements of the method of FIG. 11.

FIG. 12 is an illustration of an example of additional elements of method 226 of FIG. 11. As can be seen in FIG. 12, method 226 may additionally include determining a velocity and/or an acceleration of the pointing device based on a change of location in the workspace (e.g., a displacement) of at least one of the points of the orientation member to help determine the position of the end of the pointing device in the workspace, as indicated by block 238. Method 226 may additionally or alternatively include the element of determining the position of the end of the pointing device in the workspace, as indicated by block 240, in those instances where the orientation member is coupled to the pointing device a distance from the end of the pointing device.

The orientation member may have a geometry and method 226 may additionally or alternatively include the element of utilizing the geometry to help determine the position of the end of the pointing device in the workspace, as indicated by block 242. In some cases, the geometric property includes a centroid of the orientation member. In these instances the line segment is adjacent the centroid and substantially perpendicular to the plane.

Figure 13:
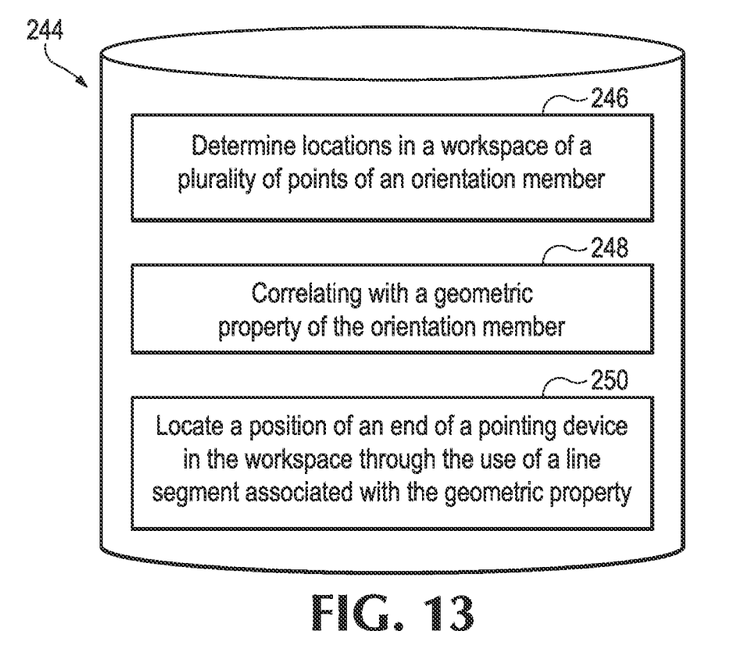
FIG. 13 is an illustration of an example of a non-volatile storage medium.

An illustration of an example of a non-volatile storage medium 244 is shown in FIG. 13. Non-volatile storage medium 244 includes instructions that, when executed a processor, such as processor 24 of FIG. 1, causes the processor to determine locations in a workspace of a plurality of points of an orientation member, as generally indicated by block 246 in FIG. 13. Non-volatile storage medium 244 includes additional instructions that, when executed by the processor, cause the processor to correlate with a geometric property of the orientation member, as generally indicated by block 248, and to locate a position of an end of a pointing device in the workspace through the use of a line segment associated with the geometric property, as generally indicated by block 250.

Figure 14:
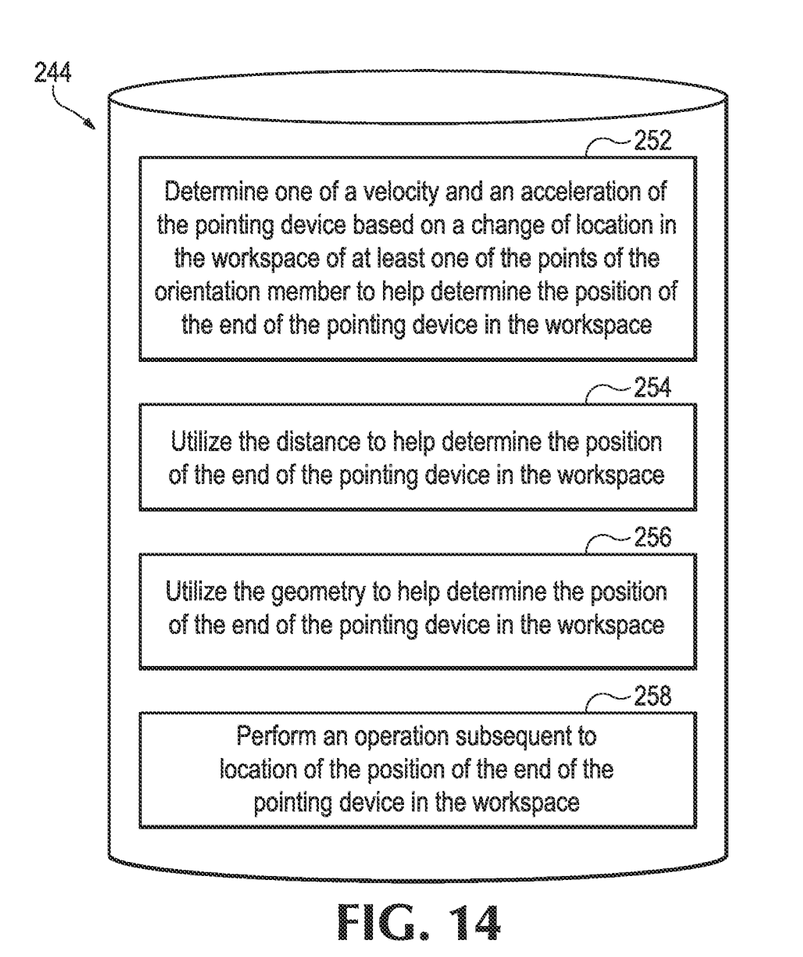
FIG. 14 is an illustration of an example of additional instructions on the non-volatile storage medium of FIG. 13.

FIG. 14 is an illustration of an example of additional instructions on the non-volatile storage medium 244 of FIG. 13. As can be seen in FIG. 14, non-volatile storage medium 244 may include additional instructions that, when executed by the processor, cause the processor to determine a velocity and/or an acceleration of the pointing device based on a change of location in the workspace of at least one of the points of the orientation member to help determine the position of the end of the pointing device in the workspace, as generally indicated by block 252. Additionally or alternatively, the orientation member may be coupled to the pointing device a distance from the end of the pointing device and the non-volatile storage medium may include additional instructions that, when executed by the processor, cause the processor to utilize the distance to help determine the position of the end of the pointing device in the workspace, as generally indicated by block 254.

The orientation member may have a geometry and the non-volatile storage medium may additionally or alternatively include instructions that, when executed by the processor, cause the processor to utilize the geometry to help determine the position of the end of the pointing device in the workspace, as generally indicated by block 256. In some cases the geometric property includes a centroid of the orientation member. In these cases, the line segment is adjacent the centroid and substantially perpendicular to the plane.

The non-volatile storage medium may additionally or alternatively include further instructions that, when executed by the processor, cause the processor to perform an operation subsequent to location of the position of the end of the pointing device in the workspace, as generally indicated by block 258. In some examples, this operation includes generation of a virtual ink on a surface in the workspace.

Several advantages can be appreciated from the examples described above and illustrated in FIGS. 1-14. For example, many different types of pointing devices may be interchangeably used rather than a single dedicated one having tracking devices. This not only provides flexibility, but also saves cost and provides ease of operation to users. As another example, because only points of an orientation member need to be detected by a sensor, rather than patterns, the apparatus 10, method 226, and instructions on non-volatile storage medium 244 require less computationally intense analysis and calculations in order to track a pointing device in a workspace. This results in a simpler and more cost-effective system. As a further example, the various types of sensors that may be used allow flexibility of implementation and application to a variety of different types of environments and uses.

Although several examples have been described and illustrated in detail, it is to be clearly understood that the same are intended by way of illustration and example only. These examples are not intended to be exhaustive or to limit the invention to the precise form or to the exemplary embodiments disclosed. Modifications and variations may well be apparent to those of ordinary skill in the art. The spirit and scope of the present invention are to be limited only by the terms of the following claims.

Additionally, reference to an element in the singular is not intended to mean one and only one, unless explicitly so stated, but rather means one or more. Moreover, no element or component intended to be dedicated to the public regardless of whether the element or component is explicitly recited in the following claims.

What is claimed is:

1. An apparatus comprising:
    at least one sensor to detect a plurality of points of an orientation member attached to a pointing device; and
    at least one processor to:
        determine, based on data from the at least one sensor, locations in a workspace of the plurality of points of the orientation member detected by the at least one sensor,
        determine a geometric property of the orientation member, the geometric property including a point in a plane defined by at least some of the plurality of points, and
        locate a position of a first end of the pointing device in the workspace, the locating comprising identifying a line segment perpendicular to the plane and connected to the point of the geometric property, wherein the orientation member is attached to a second end of the pointing device a distance from the first end of the pointing device, and the locating further utilizes the distance to determine the position of the first end of the pointing device in the workspace.

2. The apparatus of claim 1, wherein the at least one processor is to determine at least one of a velocity and an acceleration of the pointing device based on a change of location in the workspace of at least one of the plurality of points of the orientation member, as detected by the at least one sensor.

3. The apparatus of claim 1, wherein the at least one sensor includes at least one of a camera and a depth sensor.

4. The apparatus of claim 1, wherein the at least one processor is to determine the distance from the first end of the pointing device to the orientation member.

5. The apparatus of claim 1, wherein the orientation member is represented as a skeletal structure.

6. The apparatus of claim 1, wherein the orientation member has a geometry, and further wherein the at least one processor is to utilize the geometry to determine the position of the first end of the pointing device in the workspace.

7. The apparatus of claim 1, wherein the point of the geometric property includes a centroid of the orientation member, and wherein the line segment is connected to the centroid.

8. A non-transitory storage medium storing instructions that when executed cause a system including a processor to:
   receive, from at least one sensor, data representing a plurality of points of an orientation member attached to a pointing device, the plurality of points of the orientation member detected by the at least one sensor;
   determine, based on the data from the at least one sensor, locations in a workspace of the plurality of points of the orientation member;
   determine a geometric property of the orientation member, the geometric property including a point in a plane defined by the plurality of points; and
   locate a position of a first end of the pointing device in the workspace by identifying a line segment substantially perpendicular to the plane and connected to the point of the geometric property, wherein the orientation member is attached to a second end of the pointing device a distance from the first end of the pointing device, and the locating further utilizes the distance to determine the position of the first end of the pointing device in the workspace.

9. The non-transitory storage medium of claim 8, further comprising instructions that when executed cause the system to determine at least one of a velocity and an acceleration of the pointing device based on a change of location in the workspace of at least one of the plurality of points of the orientation member.

10. The non-transitory storage medium of claim 8, wherein the orientation member has a geometry, and the non-transitory storage medium further comprising instructions that when executed cause the system to utilize the geometry to determine the position of the first end of the pointing device in the workspace.

11. The non-transitory storage medium of claim 8, wherein the point of the geometric property includes a centroid of the orientation member, and further wherein the line segment is connected to the centroid.

12. The non-transitory storage medium of claim 8, further comprising instructions that when executed cause the system to perform an operation subsequent to location of the position of the first end of the pointing device in the workspace.

13. The non-transitory storage medium of claim 12, wherein the operation includes generation of a virtual ink on a surface in the workspace.

14. A method of tracking a pointing device in a workspace, comprising:
   receiving, from at least one sensor by a system including a processor, data representing a plurality of points of an orientation member attached to a pointing device, the plurality of points of the orientation member detected by the at least one sensor;
   determining, by the system based on the data from the at least one sensor, locations in a workspace of the plurality of points on the orientation member;
   determining, by the system, a geometric property of the orientation member, the geometric property including a point in a plane defined by at least some of the plurality of points; and
   locating, by the system, a position of a first end of the pointing device in the workspace by identifying a line segment perpendicular to the plane and connected to the point of the geometric property, wherein the orientation member is attached to a second end of the pointing device a distance from the first end of the pointing device, and the locating further utilizes the distance to determine the position of the first end of the pointing device in the workspace.

15. The method of claim 14, further comprising determining at least one of a velocity and an acceleration of the pointing device based on a change of location in the workspace of at least one of the plurality of points of the orientation member.

16. The method of claim 14, wherein the orientation member has a geometry, and the method further comprising determining, using the geometry, the position of the end of the pointing device in the workspace.

17. The method of claim 14, wherein the point of the geometric property includes a centroid of the orientation member, and further wherein the line segment is connected to the centroid.

18. The apparatus of claim 1, wherein the first end of the pointing device is opposite the second end of the pointing device.

19. The non-transitory storage medium of claim 8, wherein the first end of the pointing device is opposite the second end of the pointing device.

20. The method of claim 14, wherein the first end of the pointing device is opposite the second end of the pointing device.

* * * * *